Patented Apr. 10, 1945

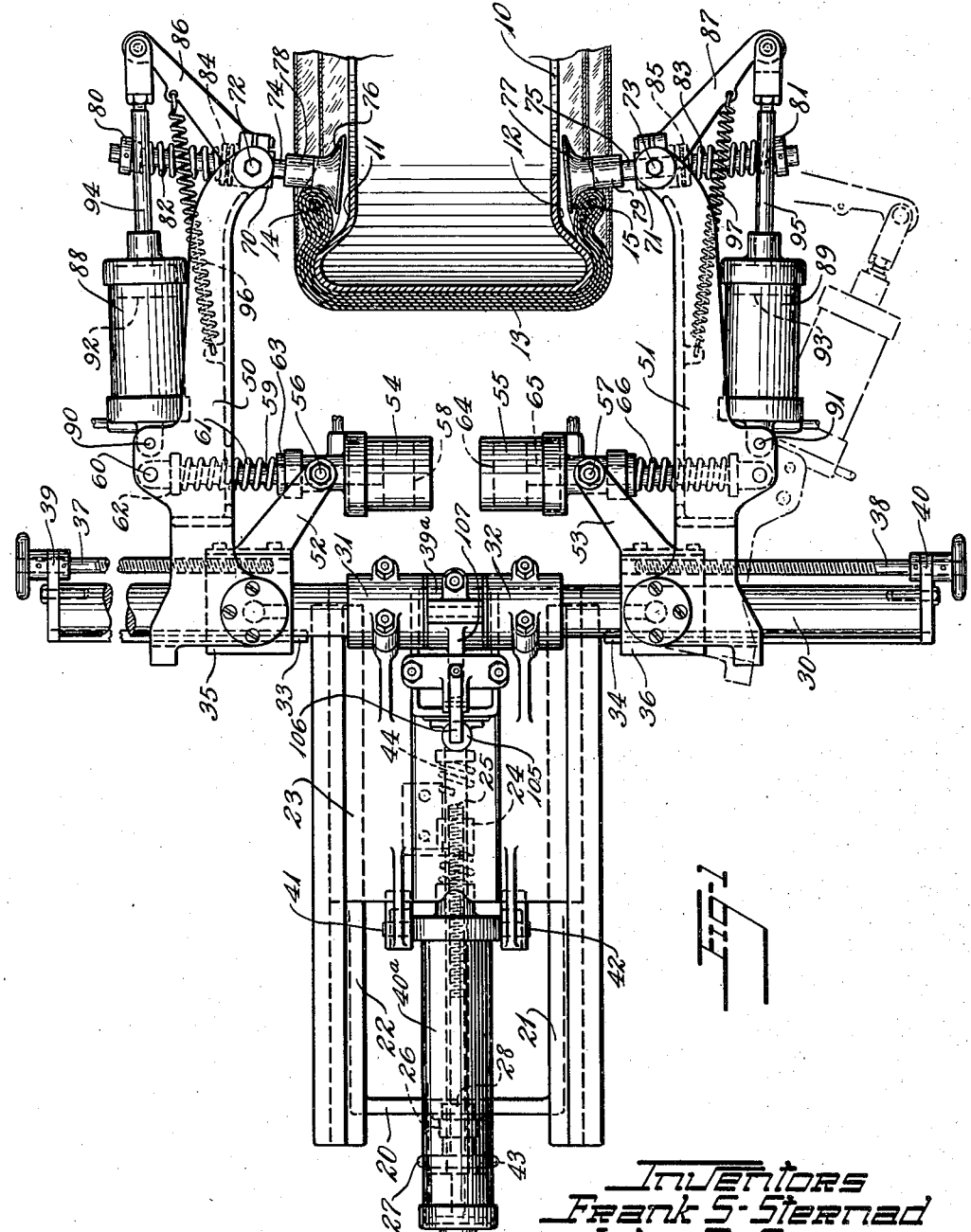

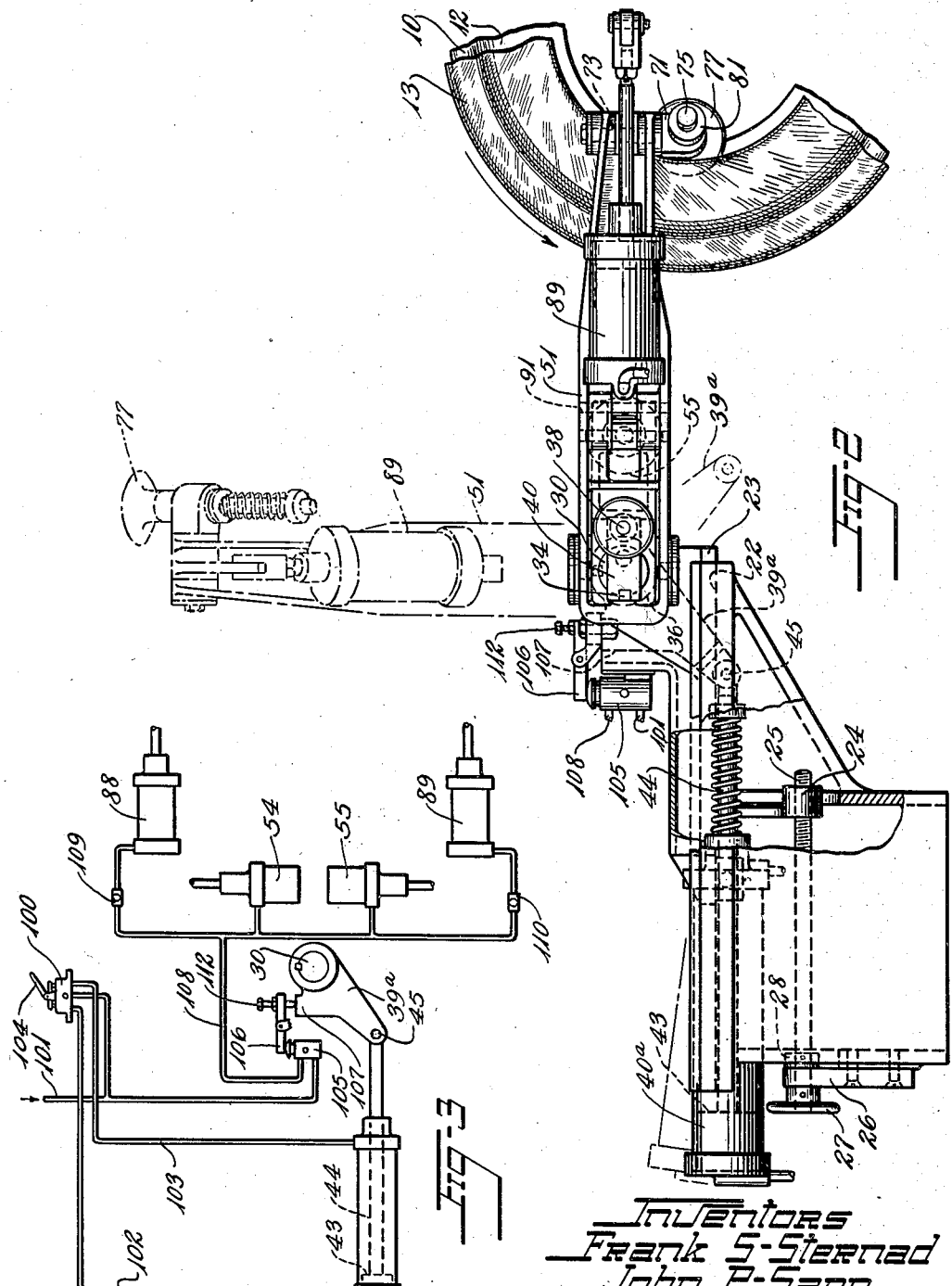

2,373,354

UNITED STATES PATENT OFFICE 2,373,354

TIRE BUILDING MACHINE

Frank S. Sternad, Cuyahoga Falls, and John P. Sapp, Kent, Ohio, assignors to The B. F. Goodrich Company, New York, N. Y., a corporation of New York Application May 27, 1944, Serial No. 537,685

8 Claims. (Cl. 154—10)

This invention relates to machines for building pneumatic tire casings and is particularly useful in forming plies about the outside of the casing at the bead cores and in breaking loose the casing from the building form.

Heretofore in building tire casings of large size on undercut drums, it has been difficult to form outer plies of rubberized cords or fabric about the outer surfaces of the bead cores and to turn them under and form them to the inner faces of the bead cores between the casing and the former. Also, loosening the casing from the former to permit removal of the casing has involved considerable difficulty.

Objects of the invention are to provide effectively for overcoming or avoiding effectively these and other difficulties; to provide stability of control of the tools with adequate force of application thereof, to provide substantially automatic action in a cycle of operation, to provide for improved advance and retraction of the tools, and to provide for convenience of manufacture and uniform high quality of the product.

These and other objects will appear from the following description and the accompanying drawings.

Of the drawings:

Fig. 1 is a plan view of apparatus constructed in accordance with and embodying the invention, showing the tire and building form in section, the position of the tools being shown in full lines in their final breaking-away position, and being indicated in dot-and-dash lines in their outermost inoperative position, parts being broken away.

Fig. 2 is a side view of the same, the tools being shown in full lines in their breaking-away position and in dot-and-dash lines in their raised inoperative position, parts being broken away.

Fig. 3 is a diagram of the control mechanism.

Referring to the drawings, the numeral 10 designates a tire former or building drum of the undercut type, having undercut sidewalls 11, 12. A tire casing 13 comprising plies of rubberized cords or fabric, and inextensible bead cores 14, 15 is shown on the drum. The drum is adapted to rotate about a horizontal axis and is supported by a power-operated drive (not shown).

A stationary frame 20 is mounted near the drive and is formed with ways 21, 22 extending radially of the drum in a horizontal direction to slideably support a carriage 23 movable toward and from the tire former. For adjusting the carriage along the ways to set the tools for operation upon tires of different diameters, the carriage has a threaded nut 24 fixed thereto, a screw 25 is journaled in the frame 20, as by means of a bracket 26 and its threaded portion engages through the nut. A hand wheel 27 is fixed to the screw at one side of the bracket 26, and a collar 28 is fixed to the screw at the other side of the bracket. The axis of the screw is parallel to the ways 21, 22 and the arrangement is such that by turning the hand wheel 27 the carriage 23 may be adjusted to any desired position relative to the drum.

For supporting the tools and moving them from an inoperative position to an operative position, a shaft 30 is rotatably mounted in bearings 31, 32 on carriage 23. The ends of the shafts have feather keys 33, 34. Brackets 35, 36 are slidably mounted on the ends of the shaft and are provided with keyways to fit the feather keys. A pair of adjusting screws 37, 38 are arranged parallel to shaft 30 and are journaled in bearings 39, 40 mounted on the ends of the shaft. The screws 37, 38 have threaded engagement with brackets 35, 36 respectively. The arrangement is such that the brackets may be adjusted along the shaft to accommodate building drums of different widths.

Shaft 30 has an arm 39ª fixed thereto at its center. A double acting fluid pressure cylinder 40ª has trunnions 41, 42 for pivotally securing it to carriage 23. It has a piston 43 connected to a piston rod 44 the end of which is pivotally connected at 45 to arm 39ª. The arrangement is such that arm 39ª and with it shaft 30 and brackets 35, 36 may be rotated in a vertical plane through an arc of about 90 degrees by fluid pressure applied against the piston.

A pair of tool supporting arms 50, 51 are pivotally mounted respectively on brackets 35, 36. Each bracket 35, 36 has an arm 52 or 53 fixed thereto. Single-acting fluid pressure cylinders 54, 55 are pivotally mounted respectively, as at 56, 57 on arms 52, 53. Cylinder 54 has a piston 58 connected to a piston rod 59. The outboard end of rod 59 is pivotally connected to arm 50, as at 60. A compression coil spring 61 encircling rod 59 has its ends impinging against a stop collar 62 near the end of rod 59 and a collar 63 carried by cylinder 54. The arrangement is such that arm 50 is normally forced outwardly away from the central plane of the drum and the cylinder 54 acts to force it laterally toward the drum. Cylinder 55 likewise has a piston 64 and rod 65 surrounded by a spring 66 and attached pivotally to arm 51 for swinging it.

In the position of the arms shown in full lines in Figs. 1 and 2 the arms 50, 51 are substantially parallel and horizontal being held in such positions by fluid pressure applied to cylinders 54, 55 to counteract springs 61, 66 and fluid pressure is also applied to the rod end of cylinder 40 to hold them horizontal. Upon release of fluid pressure in cylinders 54, 55, the arms are forced outwardly to the dot-and-dash position of Fig. 1 by springs 61, 66. Upon applying fluid pressure to the head end of cylinder 40$^a$ and exhausting the rod end, arms 50, 51 may be elevated to the vertical position shown in dot-and-dash lines in Fig. 2 to move them out of the way of the operator.

For manipulating the stitching tools a pair of tool carriers 70, 71 are pivotally mounted respectively upon shafts 72, 73 rotatably mounted on the outboard ends of arms 50, 51, the axes of the shafts being vertical when the arms are horizontal as in the full-line positions of Figs. 1 and 2. Shafts 74, 75 are slideably mounted in tool carriers 70, 71 respectively with their axes at 90 degrees to the shafts 72, 73. Stitcher wheels 76, 77 are fixed to the ends of the shafts and are of mushroom shape. Rollers 78, 79 are rotatably mounted on the shafts and provide continuations of the stem faces of the stitchers. The stitcher shafts have collars 80, 81 fixed to their outer ends. Compression coil springs 82, 83 encircle the rods between the collars 80, 81 and the tool carriers 70, 71, ball bearing thrust collars 84, 85 being provided to take the thrust of the springs and reduce friction. The tool carriers have arms 86, 87 fixed thereto. Single-acting fluid pressure operated cylinders 88, 89 are pivotally mounted respectively, as at 90, 91 to arms 50, 51. They have pistons 92, 93 fixed to rods 94, 95 which in turn are pivotally connected to the ends of arms 86, 87. Tension coil springs 96, 97 have their ends secured respectively to arms 50, 51 and arms 86, 87. The arrangement is such that cylinder 88 is used to rotate tool holder 70 in a clockwise direction, as seen in Fig. 1 and cylinder 89 is used to rotate tool holder 71 in a counterclockwise direction, while springs 96, 97 are used to return the tool holders in the opposite direction.

For providing automatic operation of the tools through a cycle of operations, a three-way reversing valve 100 adapted for manual control (see Fig. 3) is supplied by fluid, such as compressed air, through a line 101 from a pressure source (not shown). A pipe 102 connects the valve to the head end of cylinder 40. A pipe 103 connects the valve to the rod end of the same cylinder. By operating the lever 104, the operator may at one position of the valve supply fluid under pressure from line 101 to the cylinder 40 through pipe 102 and at the same time exhaust fluid from the rod end of the cylinder through pipe 103 causing the piston to move to the right as seen in the drawings and raising the arms 50, 51 to the dot-and-dash position of Fig. 2, and, at another position of the valve, can supply fluid under pressure to the rod end of the cylinder 40 through pipe 103 and exhaust the head end through pipe 102 to bring the arms back to the full line position of Fig. 2. A normally closed to pressure and open to exhaust two-way valve 105 is mounted on carriage 23. A lever 106 is pivotally mounted on the carriage with one end thereof resting on the plunger of the valve. The other end is adapted to be engaged by a stop 107 on lever 39$^a$. The arrangement is such that when the arms 50, 51 are in the raised or dot-and-dash position of Fig. 2 the valve is closed and in the lowered or full line position of the arms as seen in Fig. 2, the valve is held open. One side of the valve is supplied with fluid under pressure from line 101. A pipe 108 supplies fluid under pressure directly to cylinders 54, 55 and through sequence or delayed time valves 109, 110 to cylinders 88, 89. The arrangement is such that when valve 105 is opened cylinders 54, 55 immediately move arms 50, 51 toward each other and thereafter cylinders 88, 89 will move tool holders 70, 71 about their pivots in a direction to press the stitcher wheels radially outward of the building drum, and upon reversing valve 100 arms 50, 51 will be raised closing the supply of pressure fluid to valve 105 and opening it to exhaust cylinders 54, 55 immediately and eventually cylinders 88, 89 causing arms 50, 51 to first move apart and then causing stitcher wheels 76, 77 to be moved radially inward with respect to the building form. An adjusting screw 112 is threaded through lever 106 and may be adjusted to time the opening of valve 105 to pressure fluid. This screw is adjusted so that during the lowering of arms 50, 51 the arms will start to move toward each other causing the stitcher wheel to contact with side walls of the tire casing just above the bead portions and before the arms 50, 51 have reached their horizontal position. At this position the stitcher wheels start to stitch the fabric toward the inner margins of the bead portions. As the stitcher wheels near the radially innermost portions of the beads, cylinders 88, 89 turn the stitcher wheels toward positions parallel with the plane of rotation of the tire carcass and continue their turning movement about the bead cores so as to stitch the fabric outwardly along the inner face of the bead portions between the bead portions and the former or drum. This action tucks the edges of the fabric into the space between the tire and the drum and exerts a force radially outward of the drum, breaking loose the sides of the tire casing from the drum, which facilitates removal of the completed carcass from the drum. It also causes the fabric to be stitched neatly over the inner face of the tire casing.

The operation of the apparatus is as follows:

During the application of the underbead plies of the tire, the setting of the bead cores and the application of overbead plies of fabric to the drum, the arms 50, 51 stand in the vertical inoperative position shown in dot-and-dash lines of Fig. 2, as these operations are performed by other mechanism forming no part of the invention. The operator then applies to the tire one or more plies which are to be extended about the bead cores. These are stitched as far as the bead portions by other mechanism leaving radially inwardly extending skirts of fabric at the bead portions. The operator then depresses the operating pedal of valve 100 admitting fluid under pressure to the rod end of cylinder 40 and causing arms 50, 51 to descend toward the horizontal position. As the stitcher wheels reach the elevation of the sidewalls of the tire, stop 107 engages and opens valve 105 causing the cylinders 54, 55 to move the arms toward each other and bringing the stitcher wheels into engagement with the sidewalls at the bead portions of the tire. Immediately following, the cylinders 88, 89 start to turn the tool supports as the stitcher wheels are forced about the smallest diameter of the bead portions forcing the stitcher wheels radially outward of the tire, and as the arms continue feeding the stitcher wheels toward each other, the wheels are forced along the base of the bead portions and over the inner faces of the bead portions, smoothing the fabric therealong and breaking the adhesive engagement of the tire to the building drum. At this position the operator reverses valve 100 causing the arms 50, 51 to separate and return to their vertical positions. As the sequence valves 109, 110 cause the delay of action of cylinders 88, 89 until cylinders 54, 55 have started to separate arms 50, 51, this action forces the bead portions outwardly of the lateral faces of the drum loosening the tire therefrom at positions above the bead portions.

The apparatus is especially useful in building truck, bus, and airplane tires, where the tires are of large size and considerable force is required to separate the tire from the lateral sides of the drum due to its stiffness.

Variations may be made without departing from the scope of the invention as it is defined by the following claims.

We claim:

1. Apparatus for forming plies about the bead portions of tire casings and breaking the bead portions loose from a rotatable supporting drum during rotation of said drum, said apparatus comprising a pair of stitching wheels, a pair of arms rotatable about an axis parallel to that of the supporting drum for supporting said stitching wheels, means for rotating said arms together about their axis to move said stitching wheels toward and away from the axis of said drum to effect stitching and breaking movements radially of the sidewall of a tire casing on said drum, and means for moving said arms laterally of said drum during said breaking movement to force the sidewalls of the tire casing away from said drum.

2. Apparatus for forming plies about the bead portions of tire casings and breaking the bead portions loose from a rotatable supporting drum during rotation of said drum, said apparatus comprising a pair of stitching wheels, a pair of arms rotatable about an axis parallel to that of the supporting drum for supporting said stitching wheels, means for rotating said arms together about their axis to move said stitching wheels toward and away from the axis of said drum to effect stitching and breaking movements radially of the sidewall of a tire casing on said drum, and means for moving said arms laterally of said drum during said breaking movement to force the sidewalls of the tire casing away from said drum, said last named means comprising a power operated motor element controlled in its operation by the position of the arms in their rotative movement.

3. Apparatus for forming plies about the bead portions of tire casings and breaking the bead portions loose from a rotatable supporting drum during rotation of said drum, said apparatus comprising a pair of stitching wheels, a pair of arms rotatable about an axis parallel to that of the supporting drum for supporting said stitching wheels, means for rotating said arms together about their axis to move said stitching wheels toward and away from the axis of said drum to effect stitching and breaking movements radially of the sidewall of a tire casing on said drum, and means for moving said arms laterally of said drum during said breaking movement to force the sidewalls of the tire casing away from said drum, said last named means comprising a pressure fluid operated cylinder, a valve controlling operation of said cylinder, and cam means associated with said arms and operable in their swinging movement to control said valve by contact therewith.

4. Apparatus for forming plies about the bead portions of tire casings and breaking the bead portions loose from a rotatable supporting drum during rotation of said drum, said apparatus comprising a pair of stitching wheels, a pair of arms rotatable about an axis parallel to that of the supporting drum for supporting said stitching wheels, means for rotating said arms together about their axis to move said stitching wheels toward and away from the axis of said drum to effect stitching and breaking movements radially of the sidewall of a tire casing on said drum, and means for changing the angular relation of said stitching wheels with relation to their supporting arms, said last named means comprising a power operated motor element controlled in its operation by the position of the arms in their rotative movement.

5. Apparatus for forming plies about the bead portions of tire casings and breaking the bead portions loose from a rotatable supporting drum during rotation of said drum, said apparatus comprising a pair of stitching wheels, a pair of arms rotatable about an axis parallel to that of the supporting drum for supporting said stitching wheels, means for rotating said arms together about their axis to move said stitching wheels toward and away from the axis of said drum to effect stitching and breaking movements rodially of the sidewall of a tire casing on said drum, and means for changing the angular relation of said stitching wheels with relation to their supporting arms, said last named means comprising a pressure fluid operated cylinder, a valve controlling operation of said cylinder, and cam means associated with said arms and operable in their swinging movement to control said valve by contact therewith.

6. Apparatus for forming plies about the bead portions of tire casings and breaking the bead portions loose from a rotatable supporting drum during rotation of said drum, said apparatus comprising a pair of stitching wheels, a pair of arms rotatable about an axis parallel to that of the supporting drum for supporting said stitching wheels, means for rotating said arms together about their axis to move said stitching wheel toward and away from the axis of said drum to effect stitching and breaking movements radially of the sidewall of a tire casing on said drum, and means for changing the angular relation of said stitching wheels with relation to their supporting arms and for simultaneously moving said arms laterally of said drum during said stitching movement, said last named means comprising fluid pressure operated cylinders on said arms, a valve for controlling operation of said cylinders, and cam means associated with said arms for controlling said valve by contact therewith during movement of said arms.

7. Apparatus for forming plies about the bead portions of tire casings and breaking the bead portions loose from a rotatable supporting drum during rotation of said drum, said apparatus comprising a pair of rotatable stitching wheels, tool holders supporting said wheels for rotation about axes perpendicular to the axes of the wheels, a pair of arms rotatable as a unit about an axis parallel to that of the supporting drum for supporting said tool holders, means on said arms for rotating their respective tool holders about their axes with respect to said arms, means for moving said arms toward and from each other, means for moving said arms in their unitary rotative movement, and means in the path of rotation of said arms as a unit and operable by contact with said arms for automatically controlling the movement of said arms with respect to each other and the movement of said tool holders with respect to said arms.

8. Apparatus for forming plies about the bead portions of tire casings and breaking the bead portions loose from a rotatable supporting drum of the under-cut type during rotation of said drum, said apparatus comprising a pair of rotatable stitching wheels, tool holders supporting said wheels for rotation about axes perpendicular to the axes of the wheels, a pair of arms rotatable as a unit about an axis parallel to that of the supporting drum for supporting said tool holders, means on said arms for rotating their respective tool holders about their axes with respect to said arms, means for moving said arms toward and from each other, means for moving said arms in their unitary rotative movement, and means in the path of rotation of said arms as a unit and operable by contact with said arms for automatically controlling the movement of said arms with respect to each other and the movement of said tool holders with respect to said arms, said last named means comprising a master valve, cam means associated with said arms for controlling flow of pressure fluid through said valve, pressure fluid operated cylinders on said arms for rotating the tool support with respect thereto, sequence valves between said master valve and said cylinders providing delayed action thereof, and cylinders fed directly through said master valve for controlling movement of said arms toward and from each other.

FRANK S. STERNAD.
JOHN P. SAPP.